United States Patent [19]

Davis

[11] Patent Number: 5,784,027
[45] Date of Patent: Jul. 21, 1998

[54] SNAP POSITION BENCHMARK DATABASE AND METHOD FOR RAPID COLD START INITIALIZATION OF BASE STATION RECEIVERS

[75] Inventor: Ronald G. D. Davis, Fremont, Calif.

[73] Assignee: Trimble Navigation Limited, Sunnyvale, Calif.

[21] Appl. No.: 619,260

[22] Filed: Mar. 18, 1996

[51] Int. Cl.⁶ .............................. H04B 7/185; G01S 5/02
[52] U.S. Cl. ............................................ 342/357; 701/214
[58] Field of Search ........................ 342/357; 364/449.7; 701/214

[56] References Cited

U.S. PATENT DOCUMENTS 5,614,898  3/1997  Kamiya et al. ...................... 340/995
5,689,431  11/1997  Rudow et al. .

*Primary Examiner*—Theodore M. Blum
*Attorney, Agent, or Firm*—Thomas E. Schatzel; Law Offices of Thomas E. Schatzel A Prof. Corporation

[57] ABSTRACT

An initialization method comprises loading a real time kinematic GPS base receiver with at least one position benchmark and setting a snap mode on and selecting a snap distance. The base receiver is transported to the earth location corresponding to any one of the position benchmarks. The base receiver is turned on. The base receiver estimates its rough position in a way that allows for a quick initial solution. If such rough estimate solution is within the snap distance of any one position benchmark, then the initialization of the base station is forced to assume the position benchmark is the present position, e.g., to sub-centimeter level accuracy.

6 Claims, 3 Drawing Sheets

SNAP POSITION BENCHMARK DATABASE AND METHOD FOR RAPID COLD START INITIALIZATION OF BASE STATION RECEIVERS

BACKGROUND OF THE INVENTION

1. Field of the Invention

The invention relates generally to satellite navigation receiving equipment and more specifically to global positioning system receivers and methods of rapid cold start initialization for use in survey and mapping instruments.

2. Description of the Prior Art

Up until a few years ago, commercial real-time kinematic (RTK) systems for land surveying were simply not available. However, global positioning system (GPS) systems for navigation and positioning were already a well-established industry standard for a variety of geodetic survey applications. Surveyors using GPS systems relied on traditional post-processing with data collection times that could range up to an hour. A technique called FAST STATIC™ data collection reduced this to a few minutes. Post-processed kinematic was effective, but was risky without good satellite visibility, especially without knowledge of satellite tracking at the base receiver.

Centimeter-accurate navigation and surveying depends on being able to resolve individual cycles of the microwave carrier phase from an orbiting GPS satellite to a navigation receiver. The many cycles of phase that could be in the neighborhood of a code-based position solution create an ambiguity that is difficult, but not impossible to resolve. The integer number of cycles to each of several satellites simultaneously indicates the correct unique integer-ambiguity solution.

Real-time kinematic (RTK) surveying is a valuable branch in the science of GPS positioning. RTK has substantially improved surveying productivity in the field. RTK eliminates the time consuming post-processing of satellite data that had been an inescapable part of conventional kinematic and static GPS surveying. Quality assurance indicators are produced in real-time that guarantee the results will be good before vacating a site. In the past, cycle slips, especially at the reference GPS receiver, prevented post-processing the kinematic data and such problems were latent and ruinous. With RTK, this and other blunders in field procedures are detectable and thus costly re-surveys can be avoided.

Although RTK systems, such as the SITE SURVEYOR™ from Trimble Navigation (Sunnyvale, Calif.), have been commercially available for some time, such products require static initialization for carrier integer ambiguity resolution. The maximum benefits of RTK are only realized when such initialization processes are independent of system motion, are fully automatic and are transparent to the user/surveyor.

The performance of RTK systems is often judged by the reliability of initialization and the time it takes a receiver to initialize, both of which are interrelated. The time it takes a receiver to initialize is defined here as the time needed to produce the first centimeter-level accurate output, e.g., after a complete loss of lock on all satellites. Test conditions require four, preferably five or more satellites to be visible, in order to rely on highly efficient integer search strategies. The accuracy of the centimeter-level output of a RTK system is also a key element of the system performance.

The ability to perform surveys in real-time has many benefits across a variety of applications. Real-time communications between the reference and multiple rover stations provides integrity checking. Users are able to navigate to survey marks very accurately. But static RTK systems require the user to suffer an initialization procedure while the receiver remains stationary when first used in the field.

During initialization, the conventional GPS surveyors require occupation of a known survey mark or the location of two antennas approximately at the same place using an initializer plate. These constrain the field procedure, and can cause problems when the satellite signals become obstructed, e.g., when a user passes under a bridge. In such a case the user would be forced to return to a known point, or reinitialize the survey in some other manner.

Fully automatic ambiguity resolution (FAAR), as commercially developed by Trimble Navigation, avoids having to initialize from a known mark. A stationary base unit provides reference signals to a "rover" unit that moves about to conduct a survey. There is no constraint on the rover during initialization, it may be stationary or moving. This process has two performance parameters associated with it, the initialization reliability and the time to initialize. Both initialization time and initialization reliability are key criteria for a commercial user of a real-time kinematic system.

The GPS is part of a satellite-based navigation system developed by the United States Defense Department under its NAVISTAR satellite program. A fully operational GPS includes twenty-four satellites approximately uniformly dispersed around six circular orbits with four satellites in each orbit. The orbits are inclined at an angle of 55° relative to the equator, and are separated from each other by multiples of 60° longitude. The orbits have radii of 26,560 kilometers and are approximately circular. The orbits are non-geosynchronous, with 0.5 sidereal day (11.967 hours) orbital periods, so that the satellites move with time relative to the earth below.

Three or more GPS satellites should be visible from most points on the earth's surface, and access to three or more such satellites can be used to determine an observer's position anywhere near the earth's surface, twenty-four hours per day. Each satellite carries atomic clocks to provide timing information for the signals transmitted by the satellites. Internal clock correction is provided for each satellite clock.

Four satellites, at a minimum, are needed to uniquely determine three dimensions of position and time. If only three satellites are visible, conventional GPS software solves for latitude, longitude and time. Time is nearly always needed to be ascertained, and the altitude dimension can be constrained, e.g., assumed or provided.

Each GPS satellite transmits two spread spectrum, L-band carrier signals. An "L1" signal has a frequency $f1=1575.42$ MHz, and an "L2" signal has a frequency $f2=1227.6$ MHz. The L1 signal from each satellite is binary phase shift key (BPSK) modulated by two pseudo-random noise (PRN) codes in phase quadrature, and carries a coarse grained acquisition code (C/A-code) and a precision, fine-grained code (P-code). The L2 signal from each satellite is BPSK modulated by only the P-code.

The use of two carrier signals L1 and L2 permits the computation for partial compensation of the propagation delays of the signals through the ionosphere. This ionospheric delay varies approximately as the inverse square of signal frequency f (delay proportional to $f^{-2}$). This phenomenon is discussed by MacDoran in U.S. Pat. No. 4,463,357.

Use of the PRN codes in a code multiple access scheme allows the sorting out of the GPS satellite signals that all share the same L1 and L2 frequencies. A signal transmitted by a particular GPS satellite is selected by generating and matching, or correlating, the corresponding, unique PRN code for that particular satellite. The PRN codes come from a short list, and each is stored in GPS receivers carried by ground observers.

The P-code is a relatively long, fine-grained code having an associated clock or chip rate of $(10)(f0)=10.23$ MHz. The C/A-code allows rapid satellite signal acquisition and handover to the P-code and is a relatively short, coarser grained code having a clock or chip rate of $f0=1.023$ MHz. The C/A-code for any GPS satellite has a length of 1023 chips and thus repeats every millisecond. The full P-code has a length of 259 days, with each satellite transmitting a unique portion of the full P-code. The portion of P-code used for a given GPS satellite has a length of precisely one week (7.000 days) before this code portion repeats.

The GPS satellite bit stream includes navigational information on the ephemeris of the transmitting GPS satellite and an almanac for all GPS satellites, with additional parameters providing corrections for ionospheric signal propagation delays suitable for single frequency receivers and for an offset time between satellite clock time and true GPS time. The navigational information is transmitted at a rate of fifty baud.

The initialization of a GPS surveying base station after powering up is very time consuming in prior art devices. Repeated initializations can be very arduous. Substantial operator interface is often required to help the initialization process get started, e.g., a rough estimate of the position must be entered into the equipment. This reduces the numbers of satellites that must be searched in the initialization.

SUMMARY OF THE PRESENT INVENTION

It is therefore an object of the present invention to provide a GPS survey base station with a quicker initialization so that they can begin generating data files and RTCM outputs much sooner than is conventional.

It is another object of the present invention to provide a method for quick initialization of a real time kinematic base station to reduce user idle time.

It is a further object of the present invention to provide a simple method for quick initialization of a real time kinematic base station that requires nothing more of the user than to turn the equipment on.

Briefly, a method of the present invention comprises loading a real time kinematic GPS base receiver with at least one position benchmark and setting a snap mode on and selecting a snap distance. The base receiver is transported to the earth location corresponding to any one of the position benchmarks. The base receiver is turned on. The base receiver estimates its rough position in a way that allows for a quick initial solution. If such rough estimate solution is within the snap distance of any one position benchmark, then the initialization of the base station is forced to assume the position benchmark is the present position, e.g., to sub-centimeter level accuracy.

An advantage of the present invention is that a GPS survey base station is provided with a quicker initialization so that they can begin generating data files and RTCM outputs much sooner than is conventional.

Another advantage of the present invention is a method is provided for quick initialization of a real time kinematic base station to reduce user idle time.

A further advantage of the present invention is a simple method is provided for quick initialization of a real time kinematic base station that requires nothing more of the user in the field than to set the antenna and turn the equipment on.

These and other objects and advantages of the present invention will no doubt become obvious to those of ordinary skill in the art after having read the following detailed description of the preferred embodiment that is illustrated in the drawing figures.

IN THE DRAWINGS

DETAILED DESCRIPTION OF THE PREFERRED EMBODIMENT

Figure 1:
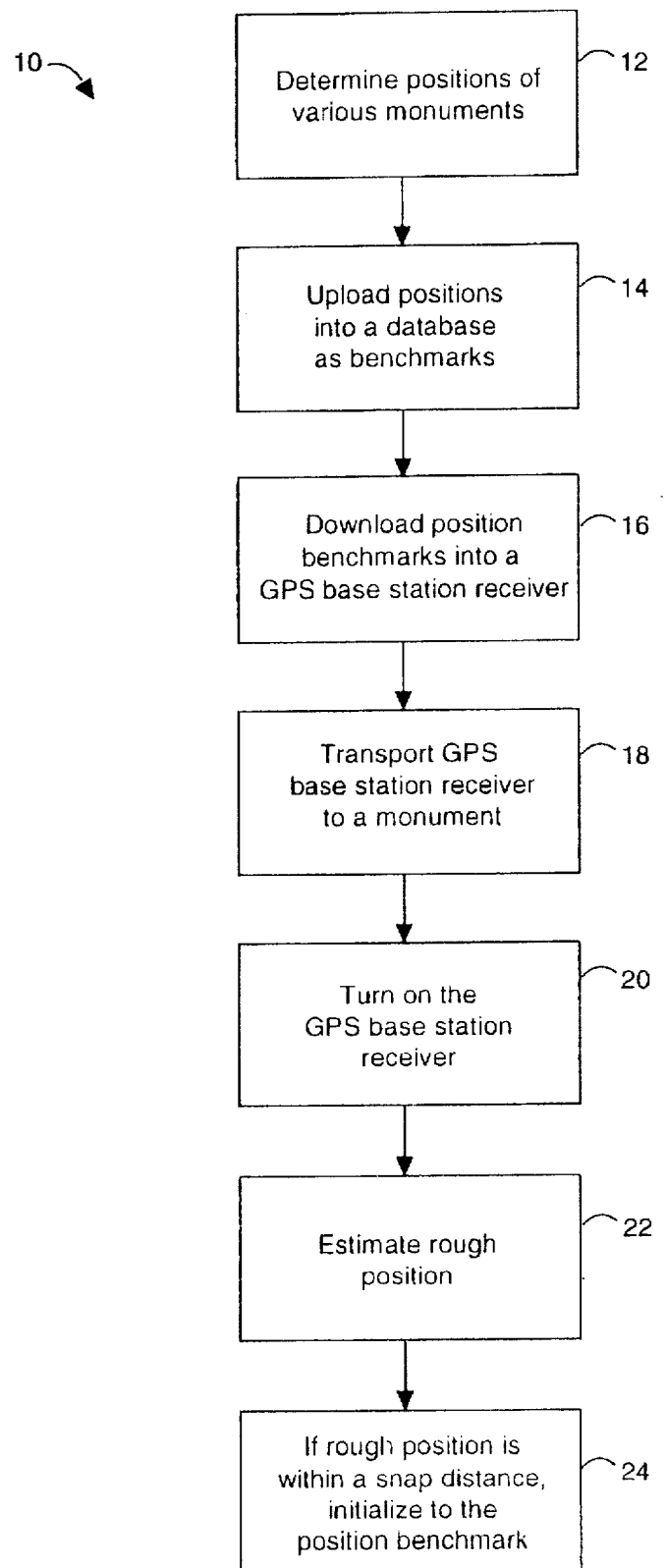
FIG. 1 is a flowchart diagram of a first method embodiment of the present invention for the collection of monument position benchmarks in a database and the rapid cold start initialization of a GPS base station receiver.

FIG. 1 illustrates a GPS base station receiver initialization method embodiment of the present invention, referred to herein by the general reference numeral 10. In a step 12, the positions of a plurality of monuments in the field, e.g., A, B, C, . . . , are determined. In a step 14, these positions are uploaded as benchmarks in an electronic database. In a step 16, such position benchmarks are downloaded into a GPS base station receiver, e.g., a SITE SURVEYOR™ via a TRIMTALK radio link, as marketed by Trimble Navigation Ltd. (Sunnyvale, Calif.). In a step 18, the GPS base station receiver is transported into the field to one of the actual monuments corresponding to those in the database of position benchmarks. In a step 20, the GPS base station receiver is turned on. In a step 22, the GPS base station receiver estimates its rough position accurate to a distance "D1", for example, to an accuracy of 100 meters. At this level of accuracy, a first position fix from a cold start can be provided relatively quickly. In a step 24, if the rough estimate of position is within a distance "D2" of any corresponding one of the downloaded position benchmarks, then the initialization of the GPS base station receiver is forced to assume its present position is the particular corresponding position benchmark. Preferably, the distances D1 and D2 are selectable.

Figure 2:
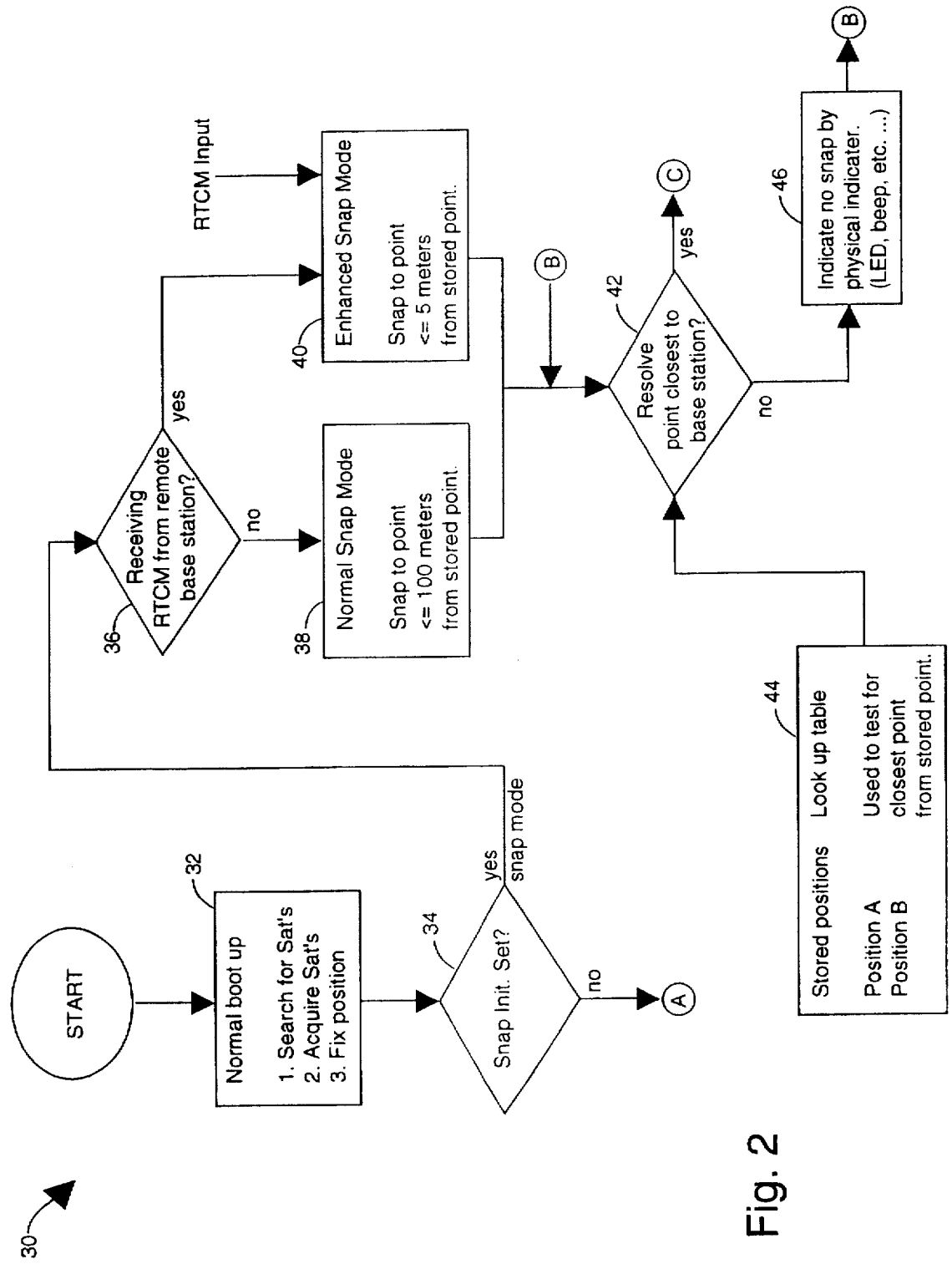
FIG. 2 is a flowchart of a first part of a second method embodiment of the present invention for the optional snap initialization of a GPS base station receiver with selectable normal and enhanced snap modes.
Figure 3:
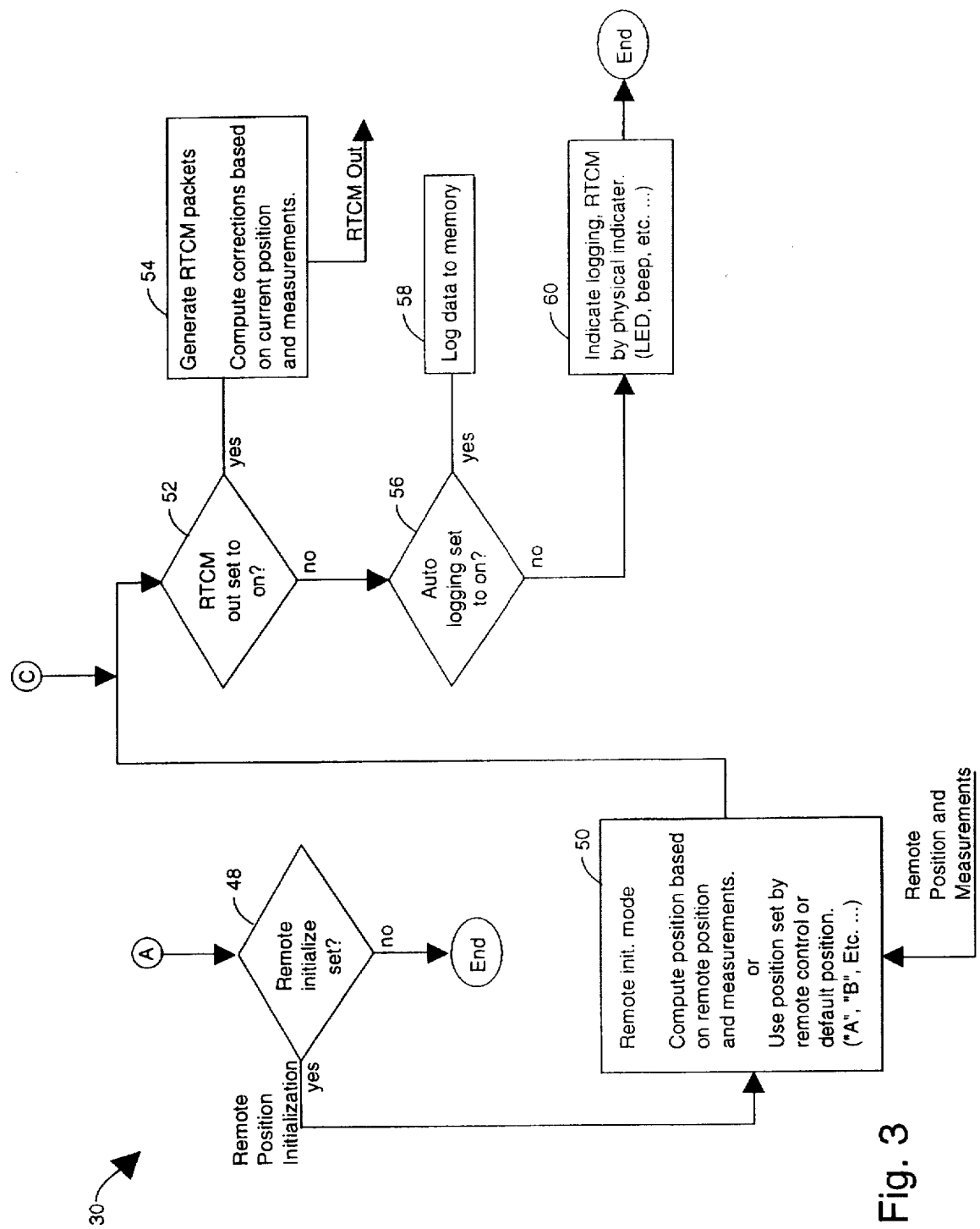
FIG. 3 is a flowchart of a continuation of the method of FIG. 2.

FIGS. 2 and 3 show respective parts of a base station snap initialization method embodiment of the present invention, referred to herein by the general reference numeral 30. The method 30 is similar to the method 10 and can be implemented as a computer program using conventional hardware marketed by GPS equipment producers such as Trimble Navigation. A step 32 begins with a conventional boot-up procedure in a GPS base station receiver that includes a search for visible GPS satellites, the acquisition of those satellites, and the determination of a position fix. In a step 34, a check is made to see if the user has enabled a snap mode. If not, flow A is followed. If enabled, then a step 36 checks to see if RTCM data is being received from a remote base station. If not, then a step 38 engages a normal snap mode where initialization snaps of as much as 100 meters are allowed. Otherwise, a step 40 engages an enhanced snap mode where initialization snaps of no more than five meters are allowed. The limits for normal and enhanced snap modes are preferably freely adjustable. Both the steps 38 and 40 and a flow B converge on a step 42 that checks if a resolution has been made of the closest base station. For this, a database 44 is consulted that comprises stored positions of monument benchmarks in a database, e.g., by using a look-up table. If the step 42 has resolved the closest base station, a flow C is followed. Otherwise, a step 46 causes a user display to indicate no snap initialization has yet taken place. This then returns to the step 42 through the flow B.

Referring to FIG. 3, the method 30 continues through the flow A with a step 48 that checks to see if the remote initialization has been set. If not, the program ends. If so, a step 50 computes the position based on such remote position or it uses a position set by remote control or a default position. Remote positions and measurements are input to the step 50. This then joins the flow C in a step 52 that checks to see if a RTCM data output has been enabled. If so, a step 54 generates RTCM data packets and computes corrections based on current position and measurements. Otherwise, a step 56 checks to see if an auto-logging mode has been set to on. If so, a step 58 logs data to a memory. If not, a step 60 indicates the status of the RTCM and logging modes on a user display and ends.

The present invention therefore includes alternative variations of methods 10 and 30. For example, the present invention includes a method for the collection of monument position benchmarks into a database and for the rapid cold start initialization of a GPS base station receiver according to one or more of the position benchmarks. Such method comprises determining the survey position of at least two monuments in a field of survey. Then, uploading the monument survey positions to a computer storage database as a position benchmark. This is followed by downloading a plurality of position benchmarks relevant to the field of survey to a navigation satellite base station receiver. The navigation satellite base station receiver is transported to near exactly a first one of the monuments, and cold started. The receiver estimates a first rough position and replaces the first rough position estimate with a first corresponding position benchmark in the navigation satellite base station receiver if the first rough position estimate is not greater than a predetermined distance "D1" from the first corresponding position benchmark. For example, D1 can be ten meters. This can be repeated at a second site without further refreshing from the database by transporting the navigation satellite base station receiver to near exactly a second one of the monuments. Then cold starting the navigation satellite base station receiver. An estimate of a second rough position of the navigation satellite base station receiver is determined. The second rough position estimate is replaced with a second corresponding position benchmark in the navigation satellite base station receiver if the second rough position estimate is not greater than a predetermined distance "D2" from the second corresponding position benchmark. The distance D2 may or may not be independent of the distance D1.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method comprising the steps of:

determining a survey position of at least one monument in a field of survey;

uploading said monument survey positions to a computer storage database as a survey-position benchmark;

downloading at least one survey-position benchmark to a satellite base station receiver while at a first position;

wherein, a collection of monument position benchmarks is assembled into said computer storage database to provide for a rapid cold start initialization of said receiver according to one or more of the position benchmarks to sub-centimeter level accuracy;

transporting said satellite base station receiver from said first position to one of said monuments;

cold starting said satellite base station receiver at a location proximate to a survey position determined in the step of determining;

estimating the rough position of said satellite base station receiver; and replacing said rough position estimate with said corresponding position benchmark in said satellite base station receiver if said rough position estimate is not greater than a predetermined distance "D" from a corresponding survey position determined in the step of determining.

2. A method for the rapid cold start initialization of a GPS base station receiver according to one or more position benchmarks stored in a monument position database, the method comprising the steps of:

downloading at least one survey-position benchmark to a satellite base station receiver while located at a first position;

transporting said satellite base station receiver from said first position to a particular monument that corresponds to one of said survey-position benchmarks;

cold starting said satellite base station receiver;

estimating the rough position of said satellite base station receiver; and replacing said rough position estimate with said corresponding survey-position benchmark in said satellite base station receiver if said rough position estimate is not greater than a predetermined distance "D" from said corresponding survey-position benchmark.

3. A method for the collection of monument position benchmarks into a database and for the rapid cold start initialization of a GPS base station receiver according to one or more of the monument position benchmarks, the method comprising the steps of:

determining the survey position of at least two monuments in a field of survey;

uploading said monument survey positions to a computer storage database as a position benchmark;

downloading a plurality of position benchmarks for said field of survey to a satellite base station receiver;

transporting said satellite base station receiver to a first one of said monuments;

cold starting said satellite base station receiver;

estimating a first rough position of said satellite base station receiver;

replacing said first rough position estimate with a first corresponding position benchmark in said satellite base station receiver if said first rough position estimate is not greater than a predetermined distance "D1" from said first corresponding position benchmark;

transporting said satellite base station receiver to a second one of said monuments;

cold starting said satellite base station receiver;

estimating a second rough position of said satellite base station receiver; and replacing said second rough-position estimate with a second corresponding position benchmark in said satellite base station receiver if said second rough position estimate is not greater than a predetermined distance "D2" from said second corresponding position benchmark.

4. A method for the optional snap initialization of a GPS base station receiver with selectable normal and enhanced snap modes, the method comprising the steps of:

booting-up a GPS base station receiver by searching for and acquiring visible satellites orbiting overhead and determining from signals received from such satellites a position fix;

checking to see if a user has engaged a snap initialization mode;

if said snap initialization mode has been set, then checking to see if said position fix is within a predetermined distance of a position benchmark stored in a look-up table; and if said position fix is within said predetermined distance, then snapping the computed position of said GPS base station receiver by replacing said position fix with said position benchmark.

5. The method of claim 4, wherein:

the checking of whether said user has engaged a snap initialization mode includes checking which of a plurality of snap modes has been engaged; and using a corresponding set of different snap distances for each of said snap initialization modes.

6. The method of claim 4, further comprising the step of:

displaying the engagement of said snap initialization mode and the execution of a snap initialization by said GPS base station receiver on a user display.

* * * * *